US008732458B2

(12) United States Patent
Liu (10) Patent No.: US 8,732,458 B2
(45) Date of Patent: May 20, 2014

(54) METHOD, SYSTEM AND TERMINAL DEVICE FOR REALIZING LOCKING NETWORK BY TERMINAL DEVICE

(75) Inventor: Xiaopeng Liu, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 190 days.

(21) Appl. No.: 13/138,018

(22) PCT Filed: Dec. 31, 2008

(86) PCT No.: PCT/CN2008/002162

§ 371 (c)(1),
(2), (4) Date: Jun. 23, 2011

(87) PCT Pub. No.: WO2010/075644

PCT Pub. Date: Jul. 8, 2010

(65) Prior Publication Data

US 2011/0271101 A1 Nov. 3, 2011

(51) Int. Cl.
*H04L 29/06* (2006.01)
(52) U.S. Cl.
USPC ........... 713/156; 713/157; 713/173; 455/410; 455/411; 455/26.1; 726/1; 726/4; 726/26
(58) Field of Classification Search
USPC ......... 713/156, 157, 173; 455/410, 411, 26.1; 726/1, 4, 26
See application file for complete search history.

(56) References Cited

U.S. PATENT DOCUMENTS

| 6,314,283 | B1* | 11/2001 | Fielden | 455/411 |
| 2001/0004591 | A1* | 6/2001 | Jeong | 455/419 |
| 2002/0142755 | A1* | 10/2002 | Takahashi et al. | 455/411 |
| 2005/0037732 | A1 | 2/2005 | Kotzin | |
| 2006/0025110 | A1* | 2/2006 | Liu | 455/411 |
| 2006/0155995 | A1* | 7/2006 | Torvinen et al. | 713/169 |
| 2008/0148044 | A1* | 6/2008 | Upp et al. | 713/156 |
| 2008/0209206 | A1 | 8/2008 | Vaha-Sipila et al. | |

FOREIGN PATENT DOCUMENTS

| CN | 101111018 | 1/2008 |
| CN | 101141731 A | 3/2008 |
| CN | 101253785 A | 8/2008 |
| JP | 2007074703 A | 3/2007 |
| WO | WO 2008/079490 | 7/2008 |

OTHER PUBLICATIONS

"3rd Generation Partnership Project; Technical Specification Group Services and System Aspects; Personalisation of Mobile Equipment (ME); Mobile functionality specification (Release 7)", Global System for Mobile Communications, vol. 7.2.0, Jun. 2008.

* cited by examiner

*Primary Examiner* — Mohammad A Siddiqi
(74) *Attorney, Agent, or Firm* — Farjami & Farjami LLP (57) ABSTRACT

A method, system and terminal device implement locking a terminal device onto a network. This method comprises a procedure of locking onto the network during accessing the network, namely performing locking-onto-network configuration verification in a network accessing authentication process, and if the locking-onto-network configuration verification is successful, allowing for verification for an authentication certificate, or else refusing the terminal device of access to the network. The method, system and terminal device in the present invention perform locking-onto-network configuration verification when performing authentication, and the terminal device and server uniformly configure a locking-onto-network character string, and thus it has a great security. Besides, the present invention also can implement unlocking and locking again after accessing the network via an air interface management in the OTA way, and thus it has high flexibility and applicability, and can satisfy the requirements of 4G networks such as the WiMAX network and LTE network.

9 Claims, 6 Drawing Sheets

```
Certificate:
    Data:
        Version: 1 (0x0)
        Serial Number: 7829 (0x1e95)
        Signature Algorithm: md5WithRSAEncryption
        Issuer: C=ZA, ST= Western Cape, L=Cape Town, O=Thawte Consulting cc,
                OU=Certification Services Division,
                CN=Thawte Server CA/emailAddress=server-certs@thawte.com
        Validity
            Not Before: Jul 9 16:04:02 1998 GMT
            Not After : Jul 9 16:04:02 1999 GMT
        Subject: c=US, ST=Maryland, L=Pasadena, O=Brent Baccala,
                OU=FreeSoft, CN=ZTE Corporation
        Subject Public Key Info:
            Public Key Algorithm: rsaEncryption
            RSA Public Key: (1024 bit)
                Modulus (1024 bit)
                    00:b4:31:98:0a:c4:bc:62:c1:88:aa:dc:b0:c8:bb:
                    33:35:19:d5:0c:64:b9:3d:41:b2:96:fc:f3:31:e1:
                    66:36:d0:8e:56:12:44:ba:75:eb:e8:1c:9c:5b:66:
                    70:33:52:14:c9:ec:4f:91:51:70:39:de:53:85:17:
                    16:94:6e:ee:f4:d5:6f:d5:ca:b3:47:5e:1b:0c:7b:
                    c5:cc:2b:6b:c1:90:c3:16:31:0d:bf:7a:c7:47:77:
                    8f:a0:21:c7:4c:d0:16:65:00:c1:0f:d7:b8:80:e3:
                    d2:75:6b:c1:ea:9e:5c:5c:ea:7d:c1:a1:10:bc:b8:
                    e8:35:1c:9e:27:52:7e:41:8f
                Exponent: 65537 (ox10001)
    Signature Algorithm: md5WithRSAEncryption
        93:5f:8f:5f:c5:af:bf:0a:ab:a5:6d:fb:24:5f:b6:59:5d:9d:
        92:2e:4a:1b:8b:ac:7d:99:17:5d:cd:19:f6:ad:ef:63:2f:92:
        ab:2f:4b:cf:0a:13:90:ee:2c:0e:43:03:be:f6:ea:8e:9c:67:
        d0:a2:40:03:f7:ef:6a:15:09:79:a9:46:ed:b7:16:1b:41:72:
        0d:19:aa:ad:dd:9a:df:ab:97:50:65:f5:5e:85:a6:ef:19:d1:
        5a:de:9d:ea:63:cd:cb:cc:6d:5d:01:85:b5:6d:c8:f3:d9:f7:
        8f:0e:fc:ba:1f:34:e9:96:6e:6c:cf:f2:ef:9b:bf:de:b5:22:
        68:9f
```

METHOD, SYSTEM AND TERMINAL DEVICE FOR REALIZING LOCKING NETWORK BY TERMINAL DEVICE

This is a U.S. national phase application which is based on, and claims priority from, PCT application Serial No. PCT/CN2008/002162, filed Dec. 31, 2008.

TECHNICAL FIELD

The present invention relates to the network security protection mechanism of the terminal device products in the wireless network communication, and particularly, to the network security protection mechanism of terminal device products in the World Interoperability for Microwave Access (WiMAX) network, and a method, system and terminal device for implementing locking onto the network.

BACKGROUND OF THE RELATED ART

After accessing the network provided by the operator, a terminal device carries out locking-onto-network operations to prevent this terminal device from accessing other networks, which is for the purposes of: 1) avoiding accessing fake base stations by the terminal device; some hackers can establish a fake base station by themselves to prevail on the terminal device to access the fake base station, thereby purloining personal information, and even damaging the terminal device; and 2) avoiding accessing the networks provided by the other operators by the terminal device. Nowadays, there is fierce competition in the communication market, and each largest operator adopts various schemes to attract new customers and retain old customers. Wherein the sale mode that terminal devices such as mobile phones/network cards and so on binds with services is one of schemes to attract new customers. In this scheme, the actual selling price of terminal devices such as mobile phones/network cards and so on is lower than the market price, so operators do not wish that the terminal devices are used by subscribers in other operators' networks after the services are finished, but wish that the subscribers would continue to use the services provide by themselves. In order to achieve the aim of retaining old customers, a requirement of adding a function of locking onto network emerges. This function can bind the terminal devices with operators, and thereby the subscribers of the terminal devices are restrained from using the services provided by other operators.

At the same time, operators can also unlock the terminal devices to satisfy various requirements, such as maintenance and repair after sale, and in particular situations, allow users to be unlocked by paying a certain fee and so on.

In order to solve the above technical problem, the present invention puts forward the following technical schemes.
Content of the Invention The problem to be solved in present invention is to provide a method, system and terminal device for implementing locking a terminal device onto a network to implement locking-onto-network function.

To solve the above problem, the present invention provides a method for implementing locking a terminal device onto a network, and this method comprises a procedure of locking onto the network during accessing the network, namely performing locking-onto-network configuration verification in a network accessing authentication process, and if the locking-onto-network configuration verification is successful, allowing for verification for an authentication certificate, or else refusing the terminal device of access to the network.

Furthermore, the network accessing authentication process refers to a process of the terminal device authenticating an Authentication Authorization Accounting (AAA) server, the locking-onto-network configuration verification refers to comparison of a locking-onto-network character string in an AAA server authentication certificate with a locking-onto-network character string stored in the terminal device, if the locking-onto-network character string in an AAA server authentication certificate is the same with that stored in the terminal device, the locking-onto-network configuration verification is considered to be successful.

Furthermore, the locking-onto-network character string refers to a network name identifier of an operator put in a CN field in a Subject in the authentication certificate.

Furthermore, in the locking-onto-network configuration verification, before performing the comparison of the locking-onto-network character strings, judging whether a locking-onto-network function is enabled according to a locking-onto-network flag bit stored in the terminal device, and if yes, performing the comparison of the locking-onto-network character strings, or else directly performing the authentication certificate verification.

Furthermore, the method further comprises a procedure of unlocking, and this procedure comprises: an Over The Air (OTA) server obtaining unlocking keys stored by an operator server and the terminal device respectively and comparing the unlocking key stored by an operator with that stored by the terminal device; and if the unlocking keys are the same, the OTA server notifying the terminal device to set the locking-onto-network flag bit as disabled locking-onto-network function and clear up the locking-onto-network character string.

Furthermore, the method further comprises a procedure of locking again after accessing the network, and this procedure comprises: an Over The Air (OTA) server calculating an unlocking key of the terminal device, and notifying an operator server and the terminal device to store this unlocking key; the OTA server transmitting the locking-onto-network flag bit and the locking-onto-network character string to the terminal device; and the terminal device storing this locking-onto-network character string and setting the locking-onto-network flag bit as enabled locking-onto-network function.

To solve the above technical problem, the present invention also provides a system for implementing locking a terminal device onto a network, and this system is used for performing locking-onto-network configuration verification in a network accessing authentication process, and allowing for verification for an authentication certificate if the locking-onto-network configuration verification is successful, or else refusing the terminal device of access to the network.

Furthermore, the system includes an Authentication Authorization Accounting (AAA) server and a terminal device, wherein the AAA server is used for transmitting an authentication certificate to the terminal device, the authentication certificate including a locking-onto-network character string;

the terminal device includes a transceiver module, a locking-onto-network module and an authentication module, wherein, the transceiver module is used for receiving the authentication certificate;

the locking-onto-network module is used for performing locking-onto-network verification for a locking-onto-network character string in the authentication certificate transmitted by the AAA server and a locking-onto-network character string stored in the terminal device, and enabling the authentication module to perform authentication if the locking-onto-network character string in the authentication certificate transmitted by the AAA server is the same with that stored in the terminal device;

the authentication module is used for verifying the authentication certificate transmitted by the AAA server according to a certificate stored by itself.

Furthermore, the locking-onto-network module is also used for storing a locking-onto-network flag bit; and if the locking-onto-network flag bit denotes that the locking-onto-network function is disabled, the locking network module is also used for directly enabling the authentication module to perform authentication, or else starting verification for the locking-onto-network character string.

Furthermore, the system further includes an Over The Air (OTA) server and an operator server; the OTA server is used for verifying unlocking keys stored by an operator server and the terminal device respectively, and notifying the terminal device to clear up the locking-onto-network character string and to reset the locking-onto-network flag bit to implement an unlocking function; the OTA server is also used for calculating an unlocking key and notifying the operator server and the terminal device to store this unlocking key, and notifying the terminal device to store the locking-onto-network character string and to set the locking-onto-network flag bit to implement a function of locking again after accessing the network; the locking-onto-network module of the terminal device is used for performing storage and update according to notifications of the OTA server.

To solve the above problem, the present invention also provides a terminal device, the terminal device has a locking-onto-network function, the terminal device including a transceiver module, a locking-onto-network module and an authentication module, wherein, the transceiver module is used for receiving an authentication certificate transmitted by an Authentication Authorization Accounting (AAA) server, and the authentication certificate includes a locking-onto-network character string;

the locking-onto-network module is used for performing locking-onto-network verification for the locking-onto-network character string in the authentication certificate transmitted by the AAA server and a locking-onto-network character string stored in the terminal device, and enabling the authentication module to perform authentication if the locking-onto-network character string in the authentication certificate transmitted by the AAA server is the same with that stored in the terminal device;

the authentication module is used for verifying the authentication certificate transmitted by the AAA server according to a certificate stored by itself.

Furthermore, the locking-onto-network module is also used for storing a locking-onto-network flag bit; and if the locking-onto-network flag bit denotes that the locking-onto-network function is disabled, the locking-onto-network module is also used for directly enabling the authentication module to perform authentication, or else starting verification for the locking-onto-network character string.

Comparing with the prior art, the method, system and terminal device in the present invention adopt the authentication process and require the terminal device and server to uniformly configure a locking-onto-network character string so as to have great security. In addition, the method, system and terminal device in the present invention can implement unlocking and locking again after accessing the network via an air interface management in the OTA way, which has high flexibility and applicability, and can well satisfy the requirements of 4G networks such as the WiMAX network and LTE network and so on.

PREFERRED EMBODIMENTS OF THE PRESENT INVENTION

The method for implementing locking a terminal device onto a network according to the present invention includes three procedures, namely, a procedure of locking onto a network during accessing the network, a procedure of unlocking and a procedure of locking again after accessing the network. The procedure of locking onto the network during accessing the network is that carrying out locking-onto-network configuration verification in a network accessing authentication process, if the locking-onto-network configuration verification is successful, allowing for verification for an authentication certificate, or else refusing the mobile terminal of access to the network.

The three procedures are described respectively below.

1. The Procedure of Locking onto a Network During Accessing the Network

Figure 1:
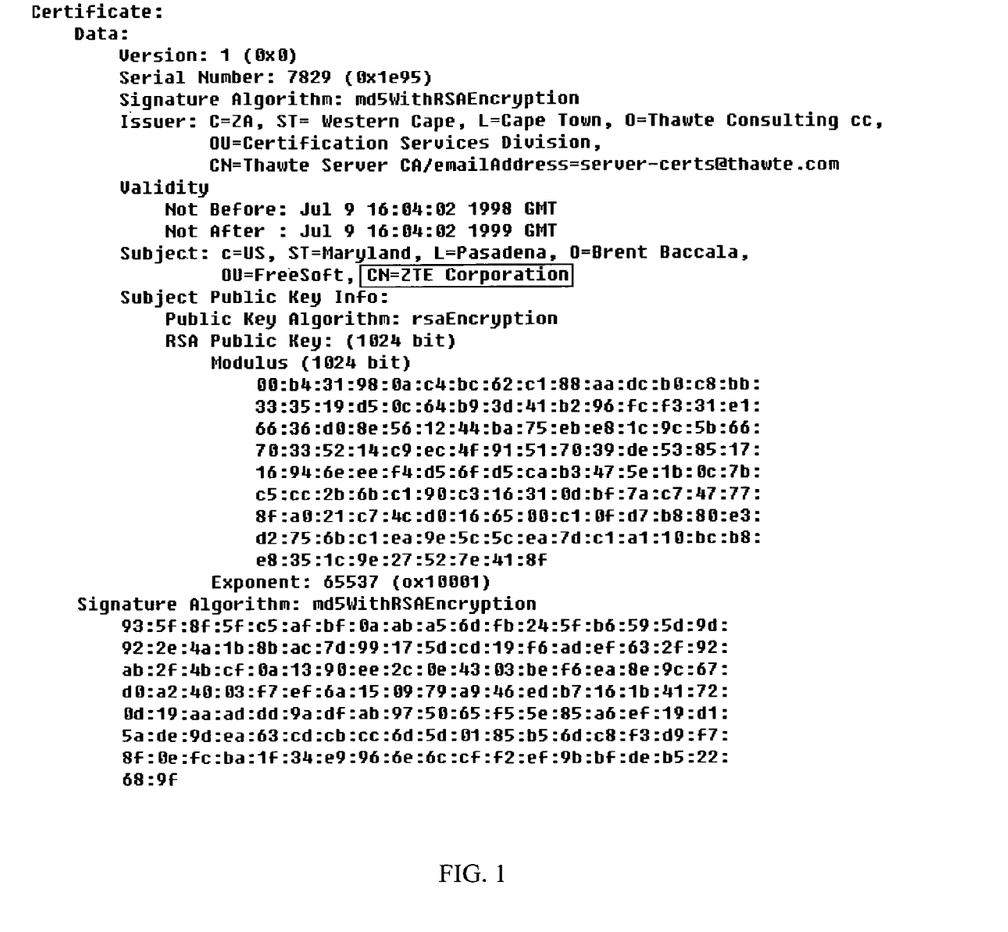
FIG. 1 is a sketch illustration of the content of the X.509 certificate.

EAP-TLS and EAP-TTLS authentications use a X.509 certificate as the identification of an AAA server and a terminal device. Besides a version, serial number, identifier of the signature algorithm, name of the signer, period of validity and public key, the X.509 certificate also includes a customized Subject. The operators put their own network name identifier into the CN field of the Subject for use in locking-onto-network verification in the process of authentication. The format of the X.509 certificate is shown in FIG. 1.

Figure 2:
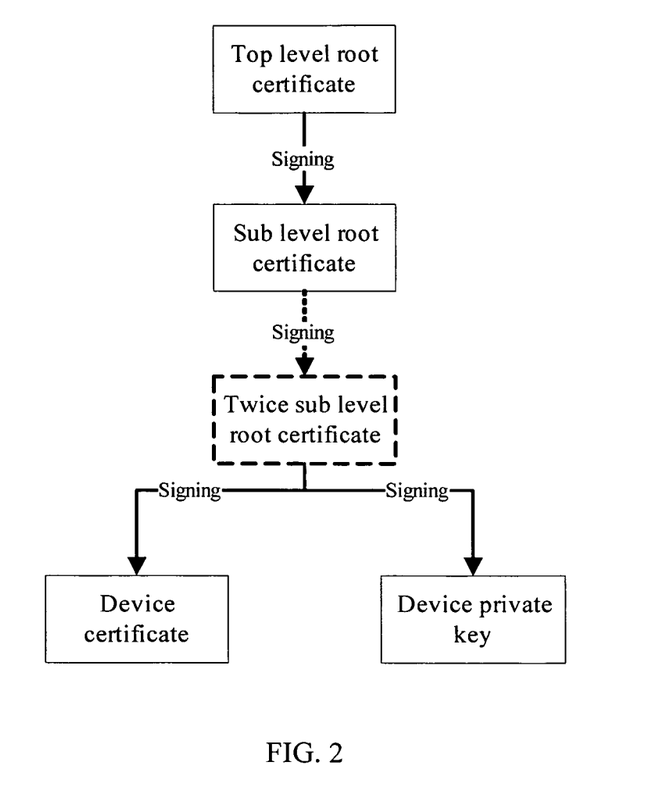
FIG. 2 is a sketch illustration of the X.509 certificate chain.

The architecture of the X.509 certificate is shown in FIG. 2, wherein the twice sub level root certificate can be omitted. Because the signature is carried out layer by layer, so only the root certificate which signs for its lower level certificate can verify this lower level certificate, and certificates with this layer architecture are called a certificate chain on the whole, as shown in FIG. 2.

According to the 806.16e protocol, the process of a WiMAX terminal device accessing the network is divided into a plurality of parts, including: searching for the network, authentication, registering, and establishing an IP connection. Wherein the authentication part is for controlling the network accessing, and the locking-onto-network function put forward in the present invention is implemented in this stage.

Figure 3:
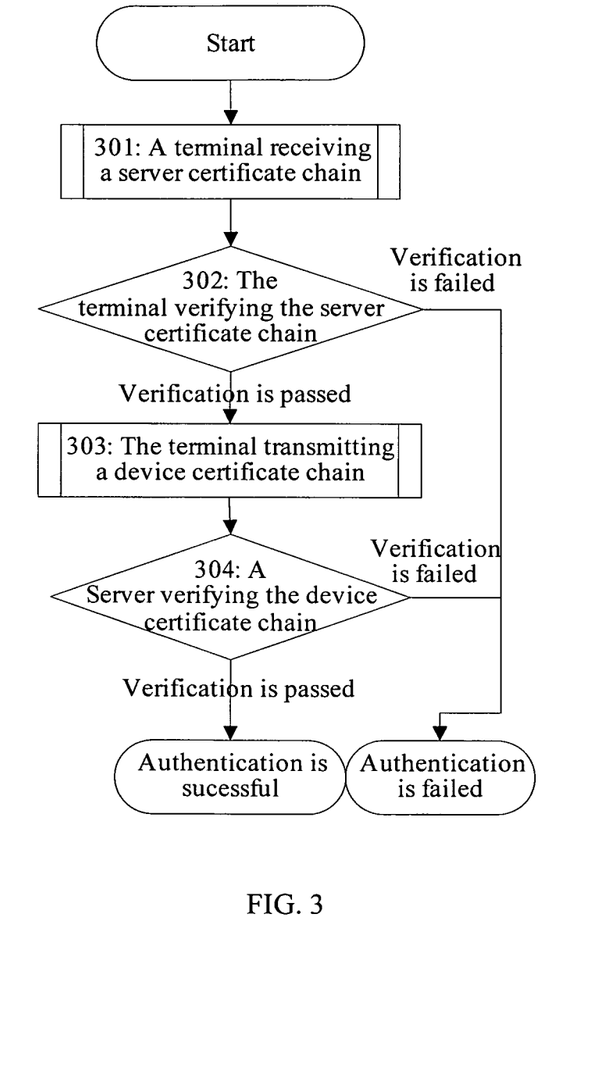
FIG. 3 is a flow chart of dual direction authentication of the EAP-TLS and the EAP-TTLS.

Two methods recommended by the WiMAX protocol are the Extensible Authentication Protocol-Transport Layer Security (EAP-TLS) and the EAP Tunneled Transport Layer Security (EAP-TTLS) based on the X.509 certificate, and the authentication flows are similar for EAP-TLS and EAP-TTLS, except that the TTLS can choose unidirectional device authentication (only authenticating the AAA server), and also can choose dual directional device authentication (the AAA server authenticating the terminal device and the terminal device authenticating the AAA server, as shown in FIG. 3), and also can choose to authenticate the user (authenticating the user according to the user name and password).

In the method of network accessing authentication based on EAP-TLS and EAP-TTLS according to the present invention, the locking-onto-network flag bit is checked and the locking-onto-network character strings are compared, and if the locking-onto-network flag bit is enabled, then the authentication is not allowed to be passed unless the locking-onto-network character string of the AAA server certificate is equal to the locking-onto-network character string stored in the terminal device, otherwise authentication failure is returned and accessing the network is refused, thereby achieving the aim of locking onto the network. The method for locking onto the network is implemented by adopting the server certificate to judge whether the current network is a legal network or not in the process of authentication, and if the network is not a legal network, the authentication fails, which results in failure in accessing network, thereby achieving the aim of locking onto the network.

The dual directional device authentication will be taken as an example for description as follows.

Figure 4:
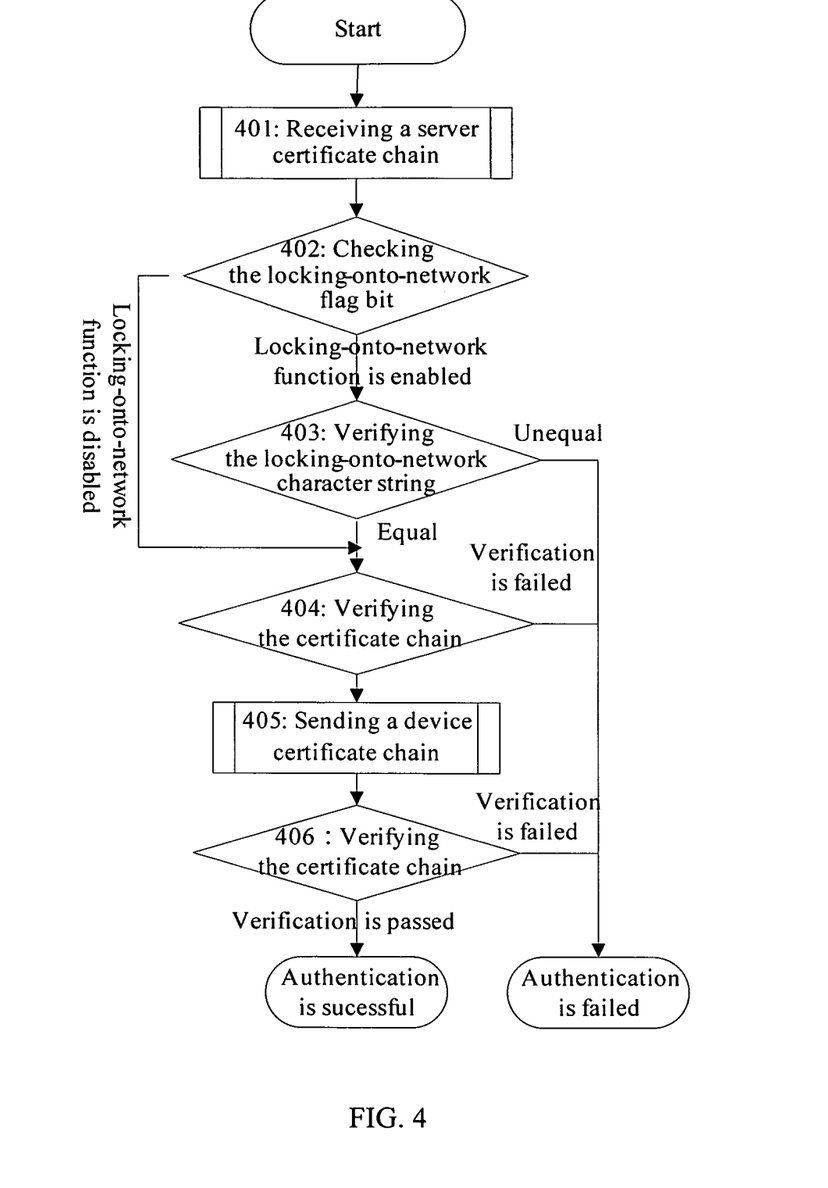
FIG. 4 is a flow chart of locking onto the network during a terminal device accesses the network according to the present invention.

As shown in FIG. 4, the flow specifically includes:

Step 401: a terminal device receiving a certificate chain transmitted by a server, this certificate chain including AAA server certificate and intermediate level certificate thereof, wherein a character string in the CN field in the server certificate is a locking-onto-network character string, which is for verifying locking onto network, and this character string is the name of the operator;

Step 402: the terminal device checking a locking-onto-network flag bit, and if this locking-onto-network flag bit indicates that the locking-onto-network function is enabled, proceeding to step 403, otherwise proceeding to step 404;

Step 403: the terminal device checking whether the locking-onto-network character string in the server certificate is the same with that stored in the terminal device, if yes, proceeding to step 404, otherwise determining that the current network is not a legal network, and directly returning the authentication failure to the AAA server, refusing the network accessing and ending the flow;

Step 404: the terminal device verifying the received server certificate chain using the top level root certificate of the AAA server certificates stored in the terminal device itself, and if the verification is passed, proceeding to step 405, otherwise returning the authentication failure to refuse the network accessing and ending the flow;

Step 405: the terminal device transmitting a device certificate chain of the terminal device (including the device certificate and intermediate level certificates) to the server;

Step 406: the AAA server verifying the received device certificate chain using stored root certificate of the device certificate, and if the verification is passed, the authentication is successful, allowing for accessing to the network, otherwise the authentication being failed, refusing the network for access.

The above flow is described by taking the dual directional terminal device authentication flow as an example, however, it can be understood that the method of the present invention is also suitable for implementing the locking-onto-network function in the unidirectional terminal device authentication flow, in which the step 405 and step 406 are lacked compared with the above flow.

The present invention adopts the locking-onto-network character string to verify the locking-onto-network, wherein the locking-onto-network character string generally is the name of the operator. The terminal device can store this value into the Electrically Erasable Programmable Read-Only Memory (EEPROM), and the enabling flag bit for the locking-onto-network function can also be stored in the EEPROM.

2. A Procedure of Unlocking

Because user is allowed to unlock the device by himself, the unlocking function should be controlled to prevent the unauthorized unlocking operation. Herein a control way using a key is adopted. A device key will be generated according to information such as the ID of the device, the main control key and so on during manufacture of the device, and then stored in the device's EEPROM. There is one-to-one correspondence between this key and the device. When the device is supplied to the operator, this key is also transferred to the operator in a secure way, and the operator stores the key into a secure database. The key can be generated with algorithms such as SHA256 and so on.

When a terminal device puts forward an unlocking request and is authorized by the operator, or the locking-onto-network time limit expires, or other conditions of unlocking are satisfied, for the terminal device whose locking-onto-network function has been enabled, the following method can be used to remove the restriction for network accessing imposed by the locking-onto-network function.

An operator's server makes use of the Over The Air (OTA) module to implement the wireless management function for terminal devices. The operator server stores parameters of each terminal device such as Mac ID and unlocking key and so on. An OTA server reads the unlocking key corresponding to this terminal device, and the unlocking key from the EEPROM of the device through OTA interface, and performs comparison on them. If they are the same, the OTA server sets the locking-onto-network flag bit to be FALSE and clears up the locking-onto-network character string, otherwise unlocking fails.

Figure 5:
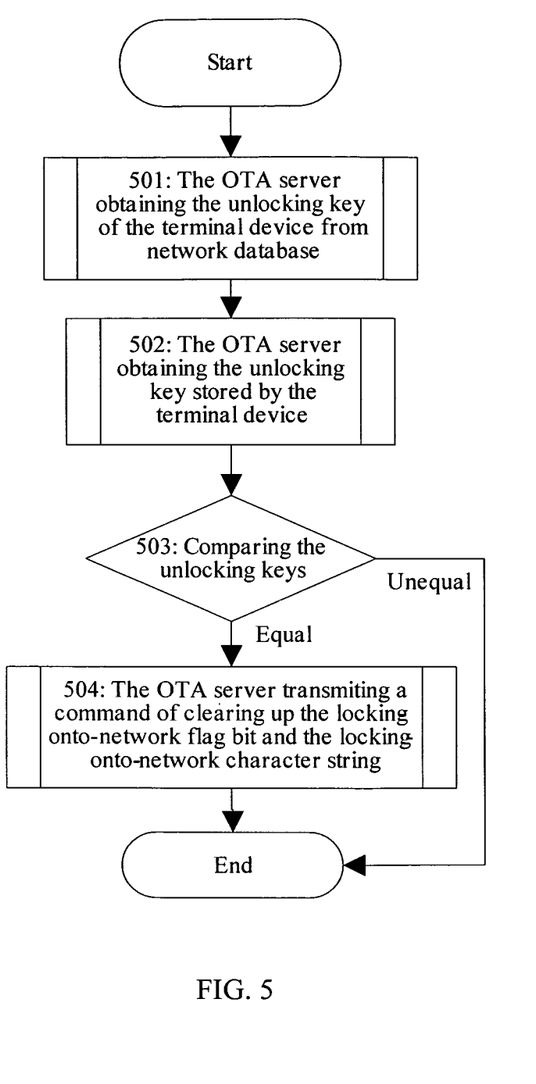
FIG. 5 is a flow chart of unlocking according to the present invention.

As shown in FIG. 5, it is a flow of unlocking implemented by the operator server or terminal device, including following steps.

Step 501: the OTA server obtains the unlocking key of the terminal device and the terminal device ID stored by the operator server;

Step 502: the OTA server obtains the unlocking key stored by the terminal device with corresponding ID via an OTA way;

Step 503: the OTA server compares the obtained unlocking keys, and if they are the same, step 504 is carried out, otherwise the flow is ended.

Step 504: the OTA server transmits an unlocking notification to the terminal device by an OTA way to make the terminal device reset the locking-onto-network flag bit to be FALSE and clear up the locking-onto-network character string in order to implement unlocking.

It also can change the locking-onto-network configuration directly by the operator server or the terminal device without performing the unlocking key verification. Unlocking key verification is only for enhancing the security.

3. The Procedure of Locking Again after Accessing the Network

Figure 6:
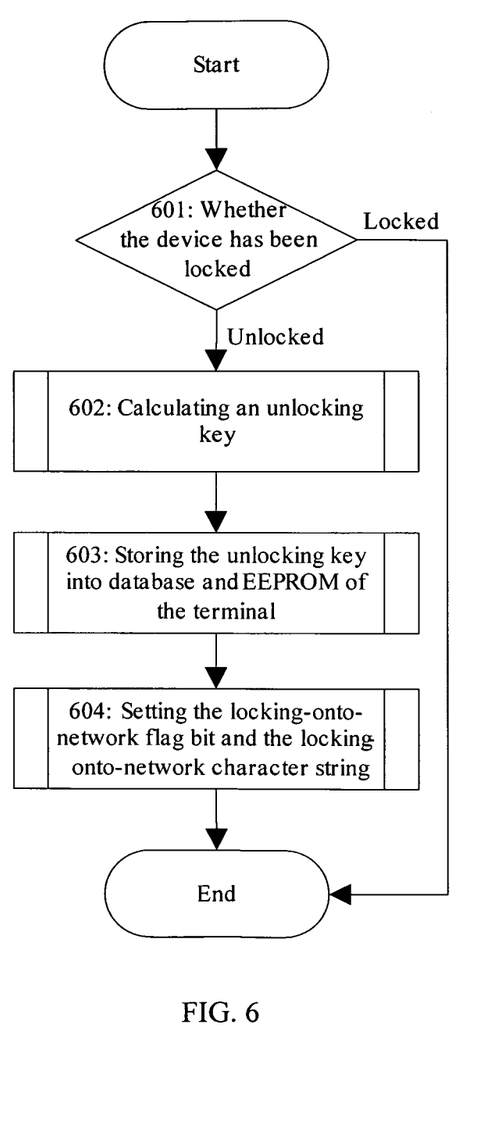
FIG. 6 is a flow chart of locking onto the network again after accessing the network according to the present invention.

The unlocked devices can be locked again after accessing the network once again, which is implemented by the OTA way using an air interface. The process of locking again after the device accesses the network is shown in FIG. 6, including following steps.

Step 601: a terminal device reads the locking-onto-network flag bit stored in the device to judge whether it has been locked, if yes, the flow is ended, or else step 602 is carried out;

Step 602: the OTA server in the network side acquires that the terminal device is not locked by the OTA way, and then calculates an unlocking key according to parameters of the terminal device such as the Mac address, current time, network ID and so on;

Step 603: the OTA server in the network side transmits the calculated unlocking key to the operator server for storage, and at the same time, transmits the calculated unlocking key to the terminal device by the OTA mode to make the terminal device update the locking-onto-network key in the EEPROM;

Step 604: the OTA server in the network side transmits a locking notification to the terminal device by the OTA way, wherein the locking notification carries the locking-onto-network character string and locking-onto-network flag bit (TRUE or FALSE) to make the terminal device update the value of corresponding field in the EEPROM.

In order to implement above method, the present invention also provides a system for implementing locking the terminal device onto the network. This system includes an AAA server, an operator server and a terminal device, wherein, The operator server is for storing parameters such as the Mac ID of the terminal device and the locking-onto-network key and so on.

The AAA server refers to the network server, which has Authentication, Authorization and Accounting functions, and it particularly includes a transceiver module and an authentication module, wherein The transceiver module is for receiving and transmitting various signaling messages, including transmitting a certificate chain to the terminal device, receiving the certificate chain transmitted by the terminal device and transmitting an authentication response according to an authentication result, said certificate chain transmitted to the terminal device includes a locking-onto-network character string.

The authentication module is for verifying the certificate chain transmitted by the terminal device according to the certificate stored by itself.

The terminal device refers to a network product terminal device such as the network card, mobile phone and so on, including a transceiver module, an authentication module and a locking-onto-network module.

Wherein, the transceiver module is for receiving or transmitting various signaling messages, including receiving the certificate chain transmitted by the AAA server and transmitting a certificate chain of the terminal device to the AAA server, and transmitting authentication responses to the AAA server according to the verification results of the authentication module and the locking-onto-network module.

If the verification of the locking-onto-network module is not passed, the transceiver module transmits an authentication failure response to the AAA server directly.

The authentication module is for verifying the certificate chain transmitted by the AAA server according to the certificate stored by itself.

The locking-onto-network module is for storing the locking-onto-network flag bit and locking-onto-network character string, the locking-onto-network flag bit is for denoting whether the locking-onto-network function is enabled, and if the locking-onto-network flag bit denotes that the locking-onto-network function is enabled, the locking-onto-network module is also for verifying the locking-onto-network flag bit in the certificate chain transmitted by the AAA server and the locking-onto-network flag bit stored by itself, if they are the same, the locking-onto-network module is also for triggering the authentication module to authenticate, if the locking-onto-network flag bit denotes the locking-onto-network function is not enabled, the locking-onto-network module is also for directly starting the authentication module to authenticate.

In order to implement the unlocking function, the system of the present invention further includes an OTA server, which is used for obtaining the unlocking key of the terminal device in the operator server and the unlocking key stored in corresponding terminal device, also used for comparing the obtained unlocking keys and transmitting an unlocking notification if the obtained unlocking keys are the same.

Said locking-onto-network module of the terminal device is used for providing stored unlocking key to the OTA server and resetting the locking-onto-network flag bit and clearing up the locking-onto-network character string according to the unlocking notification.

In order to implement the locking-onto-network function again after accessing the network, the OTA server is also used for calculating the unlocking key of the terminal device and notifying the operator server and the terminal device to store the unlocking key. The OTA server is also used for sending a locking notification to terminal device, wherein the locking notification includes the locking-onto-network flag bit and the locking-onto-network character string.

Said locking-onto-network module of the terminal device is used for judging whether it has been locked according to the locking-onto-network flag bit, and also used for setting the locking-onto-network flag bit and updating the locking-onto-network character string according to the locking-onto-network notification transmitted by the OTA server to implement locking-onto-network function again after accessing the network.

Similarly, the present invention also provides a terminal device, and this terminal device can implement the locking-onto-network function during accessing the network. And the particular modular architecture is the same with above description.

In above method, system and terminal device, it only provides a possibility of enabling a locking-onto-network function using the locking-onto-network flag bit, and the operator or terminal device has a right to choose whether to enable the locking-onto-network function. Certainly, the present invention also can be implemented without the locking-onto-network flag bit. In order to ensure the compatibility with existing terminal device, the present invention can be implemented by determining whether this terminal device has the locking-onto-network function according to the information which has certain description significance such as the manufacture date of the terminal device, and then carrying out locking-onto-network verification.

For the EAP-TTLS way according to the present invention, any authentication method, no matter which authentication way it belongs to, can be used as long as the authentication method includes authenticating for the server, because the authenticating for the server means the locking-onto-network character string can be read from the server certification so that the locking-onto-network character string can be compared with the character string stored in the terminal device to achieve the aim of locking onto the network.

INDUSTRIAL APPLICABILITY

Comparing with the prior art, the method, system and terminal device in the present invention adopt the authentication process, and require the terminal device and server to uniformly configure a locking-onto-network character string so as to have a great security. In addition, the method, system and terminal device in the present invention can implement unlocking and locking onto the network after accessing the network via an air interface management in an OTA way, which has high flexibility and applicability, and can well satisfy the requirements of 4G networks such as the WiMAX network and LTE network and so on.

I claim:

1. A method for locking a terminal device onto a network while accessing said network, and said method comprising:
comparing, by said terminal device, a first locking-onto-network character string in an Authentication Authorization Accounting (AAA) server authentication certificate with a second locking-onto-network character string stored in said terminal device in a process of said terminal device authenticating an AAA server;
if said comparing determines that said first locking-onto-network character string is the same as said second locking-onto-network character string, said a locking-onto-network configuration verification is successful;
if said locking-onto-network configuration verification is successful, allowing for verification of an authentication certificate;
if said locking-onto-network configuration verification is not successful, refusing access by said terminal device to the network; and
said method for locking further comprising a procedure of unlocking, wherein the procedure of unlocking comprising:
an Over The Air (OTA) server obtaining and comparing unlocking keys stored by an operator server and said terminal device respectively; and
if the unlocking keys are the same, the OTA server notifying said terminal device to set the locking-onto-network flag bit as disabled locking-onto-network function and clear up said second locking-onto-network character string.

2. The method as claimed in claim 1, wherein said first locking-onto-network character string refers to a network name identifier of an operator put in a Content Name (CN) field in a Subject in the authentication certificate.

3. The method as claimed in claim 1, further comprising:
before the comparing, determining whether a locking-onto-network function is enabled according to a locking-onto-network flag bit stored in the terminal device, and if yes, performing the comparing, or else directly performing the authentication certificate verification.

4. The method as claimed in claim 3, further comprising:
locking again after accessing the network, the locking comprising:
an Over The Air (OTA) server calculating an unlocking key of said terminal device, and
notifying an operator server and said terminal device to store said unlocking key;
said OTA server transmitting the locking-onto-network flag hit and the second locking-onto-network character string to said terminal device; and
said terminal device storing said second locking-onto-network character string and setting said locking-onto-network flag bit as enabled locking-onto-network function.

5. A system for locking a terminal device onto a network, and said system performing locking-onto-network configuration verification in a network accessing authentication process, and allowing for verification for an authentication certificate if said locking-onto-network configuration verification is successful, or else refusing the terminal device of access to the network;
wherein said system includes an Authentication Authorization Accounting (AAA) server and a terminal device, wherein
said AAA server is configured to transmitting an authentication certificate to the terminal device, said authentication certificate including a first locking-onto-network character string;
said terminal device includes at least one processor executing a transceiver module, a locking-onto-network module and an authentication module to:
receive, using said transceiver module, said authentication certificate;
perform, using said locking-onto-network module, locking-onto-network verification by comparing the first locking-onto-network character string in the authentication certificate transmitted by the AAA server and a second locking-onto-network character string stored in the terminal device, and enable said authentication module to perform authentication if the first locking-onto-network character string in the authentication certificate transmitted by the AAA server is the same as the second locking-onto-network character string;
verify, using said authentication module, the authentication certificate transmitted by the AAA server according to a certificate;
said system further includes an Over The Air (OTA) server and an operator server; said OTA server is configured to verify unlocking keys stored by said operator server and said terminal device respectively, and notify said terminal device to clear up said first locking-onto-network character string and to reset the locking-onto-network flag bit to implement an unlocking function; said at least one processor executing said locking-onto-network module to perform storage and update according to notifications of said OTA server.

6. The system as claimed in claim 5, wherein
said at least one processor executing said locking-onto-network module to store a locking-onto-network flag bit; and if the locking-onto-network flag hit denotes that the locking-onto-network function is disabled, said at least one processor executing said locking-onto-network module to directly enable said authentication module to perform authentication, or else start the verification.

7. The system as claimed in claim 6, wherein said OTA server is also configured to calculate an unlocking key and notify said operator server and said terminal device to store said unlocking key, and notify said terminal device to store the second locking-onto-network character string and to set the locking-onto-network flag hit to implement a function of locking again after accessing the network.

8. A terminal device, said terminal device having at least one processor executing a locking-onto-network function, said terminal device including a transceiver module, a locking-onto-network module, an authentication module and an unlocking module, to:
receive, using said transceiver module, an authentication certificate transmitted by an Authentication Authorization Accounting (AAA) server, and said authentication certificate includes a first locking-onto-network character string;
perform, using said locking-onto-network module, locking-onto-network verification by comparing the first locking-onto-network character string in the authentication certificate transmitted by the AAA server and a second locking-onto-network character string stored in the terminal device, and enable said authentication module to perform authentication if the first locking-onto-network character string in the authentication certificate transmitted by the AAA server is the same as the second locking-onto-network character string;

verify, using said authentication module, the authentication certificate transmitted by the AAA server according to a certificate; and set, using said unlocking module, the locking-onto-network flag hit as disabled locking-onto-network function and clear up said second locking-onto-network character string after receiving, a notification from an Over The Air (OTA) server.

9. The terminal device as claimed in claim 8, wherein said at least one processor executing said locking-onto-network module to store a locking-onto-network flag bit; and if the locking-onto-network flag bit denotes that the locking-onto-network function is disabled, said at least one processor executing said locking-onto-network module to directly enable said authentication module to perform authentication, or else start the verification.

* * * * *

UNITED STATES PATENT AND TRADEMARK OFFICE
CERTIFICATE OF CORRECTION

PATENT NO.       : 8,732,458 B2                                        Page 1 of 1
APPLICATION NO.  : 13/138018
DATED            : May 20, 2014
INVENTOR(S)      : Xiaopeng Liu It is certified that error appears in the above-identified patent and that said Letters Patent is hereby corrected as shown below:

In The Claims

Column 9, Line 19, Claim 1 "string said a" should be --string a--.

Column 10, Line 4, Claim 5 "transmitting" should be --transmit--.

Column 10, Line 50, Claim 7 "hit" should be --bit--.

Column 11, Line 9, Claim 8 "hit" should be --bit--.

Signed and Sealed this
Nineteenth Day of May, 2015

Michelle K. Lee
*Director of the United States Patent and Trademark Office*